UNITED STATES PATENT OFFICE.

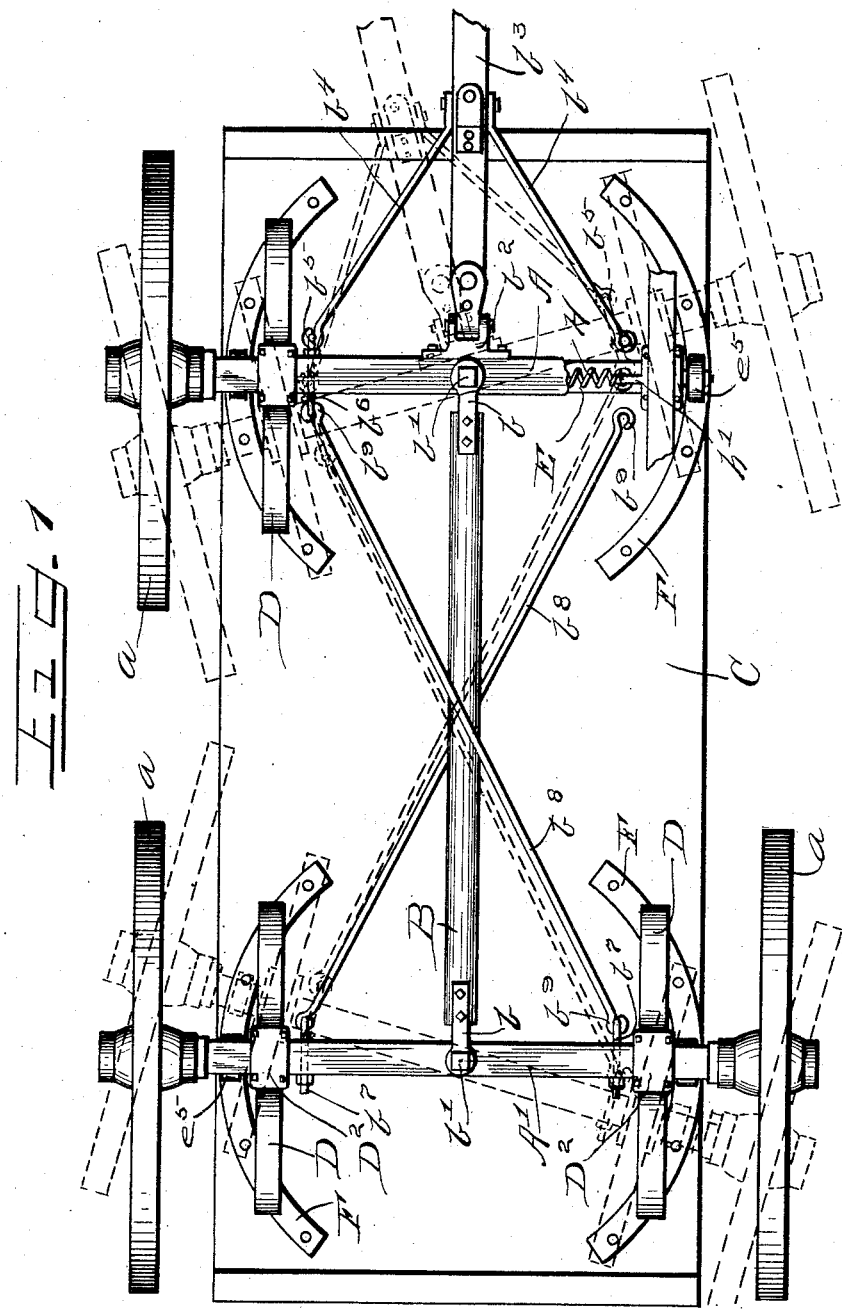

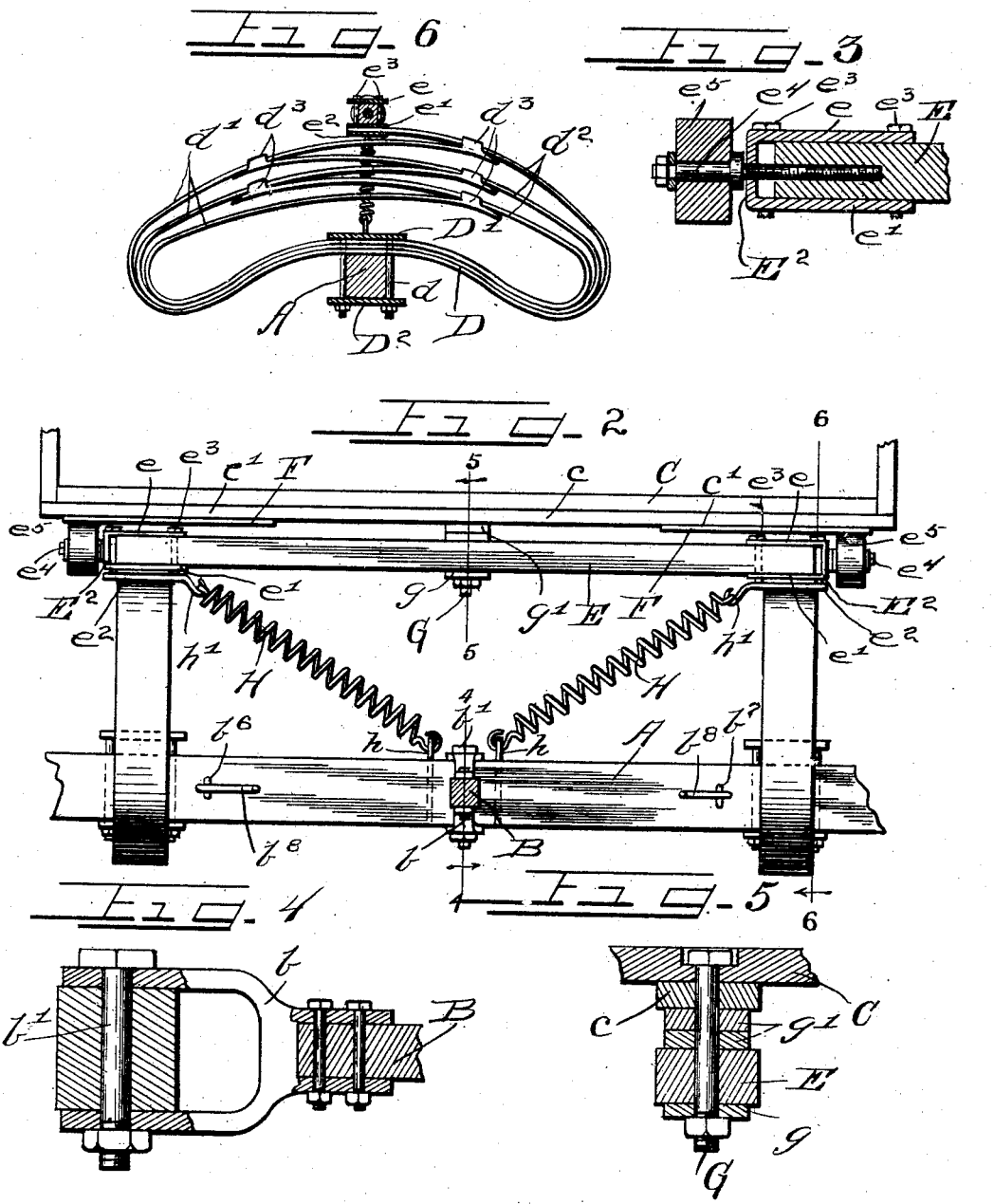

ELMER L. BRILLHART, OF LUDINGTON, MICHIGAN.

VEHICLE.

No. 866,769.   Specification of Letters Patent.   Patented Sept. 24, 1907.

Application filed September 9, 1905. Serial No. 277,656.

*To all whom it may concern:*

Be it known that I, ELMER L. BRILLHART, a citizen of the United States, and a resident of the city of Ludington, county of Mason, and State of Michigan, have invented certain new and useful Improvements in Vehicles; and I do hereby declare that the following is a full, clear, and exact description of the same, reference being had to the accompanying drawings, and to the letters of reference marked thereon, which form a part of this specification.

This invention relates to improvements in vehicles and more particularly to a wagon of that class in which both axles cramp in turning. In devices of this class the connections between the front and rear axles should be as direct and simple as possible since a complicated connection causes more or less play at the joints even when new as well as when the parts wear, thereby causing a consequent increase in time required for the rear axle to respond to the turning action. Furthermore the less lost motion contained in the connections between the axles the better the front and rear wheels will track when moving straight ahead thereby causing an easy draft of the vehicle. It has been objectionable in many vehicles as heretofore constructed that when the axle is cramped in turning the box or load has a much narrower bearing thereon thus increasing the tendency to overturn.

The object of this invention is to provide a vehicle having both axles pivoted to enable it to turn a relatively sharp corner and in which the play in the connecting reaches or rods for the axles is reduced to a minimum.

A further object of the invention is to provide a vehicle in which the load is at all times perfectly distributed on the running gear in turning thus obviating the tendency to overturn.

The invention consists in the matters hereinafter described and more fully pointed out and defined in the appended claims.

In the drawings: Figure 1 is a fragmentary bottom plan view of a device embodying my invention. Fig. 2 is an enlarged fragmentary, transverse section of the vehicle frame. Fig. 3 is an enlarged fragmentary section of one of the bearing rollers and the bolster. Fig. 4 is an enlarged fragmentary view, partly in section and partly in elevation, illustrating the connection of the reach with the axle. Fig. 5 is an enlarged fragmentary section taken on line 5—5 of Fig. 2. Fig. 6 is a section taken on line 6—6 of Fig. 2 with parts removed.

As shown in said drawings: A and A' represent the front and rear axles respectively and are connected by a reach B which, as shown, is provided at each end with a yoke $b$ rigidly engaged thereto and pivotally engaged to the axles by means of bolts $b'$—$b'$ which pass through the arms thereof and through said axles. A pivot bearing $b^2$ is rigidly bolted to the front side of the axle A and affords pivotal connections with the draft tongue $b^3$, which is braced laterally to said axle by means of the brace rods or hounds $b^4$, which at their rear ends are secured to the axle by means of eye bolts $b^5$. Corresponding eye bolts $b^6$ and $b^7$ respectively are engaged in and project from the rear side of the front axle and the front side of the rear axle, respectively, at corresponding distances from the center and connected in said eye-bolts are rods $b^8$ each of which extends from one eye bolt on the front axle to the eye bolt on the rear axle on the opposite side of the reach therefrom and together act to move the corresponding ends of the axles oppositely when the front wheels are cramped as shown in dotted lines in Fig. 1. Said rods as shown are provided with hooked ends $b^9$ which closely engage the eye bolts $b^6$ and $b^7$ and while affording a hinge or swinging movement therein have approximately no longitudinal movement with respect thereto.

Rigidly secured upon each end of each axle adjacent the sides of the box C are the springs D which may be of any preferred construction, but as shown, each comprises a stack of upwardly curved, double ended leaf springs secured at their middle upon the axle by means of a clip comprising upper and lower plates of metal D' and D² which engage below the axle and above the central portion of the leaves of said springs. Bolts $d$ extend through said plates on each side of the axle and rigidly bind the same upon the axle. Said bolts bear closely against the sides of the springs and the axle and hold the same from relative movement. The upper or free ends $d'$—$d^2$ of said springs overlap each other and are each provided with laterally disposed flanges $d^3$ between which the next higher overlapping leaf slidingly engages as shown more clearly in Fig. 6.

The outermost or upper leaf or end $d^2$ of each spring has secured thereon one end of one of the bolsters E which consists of a bar of wood or metal of requisite length rigidly secured on said upper spring ends by means of a clip, similar to that which secures the spring to the axle and comprises as shown a plate or strap of metal E², the ends of which $e$ and $e'$ are bent to engage above and below the bolster E and a plate $e^2$ which engages beneath the spring. All of said plates are rigidly secured together by transverse bolts $e^3$ which extend through the same in close proximity to the sides of the spring and the bolster and act to hold the same in unvarying relation. The strap of metal $E^2$ affords a bearing for the journal or axle $e^4$ secured in each end of each bolster. Said journal as shown is provided at its inner end with a wood screw having threaded engagement in said strap and the end of the bolster and is provided on its outer end with a roller $e^5$ of a diameter to extend slightly above the bolster.

Rigidly engaged beneath the bottom of the box C are the reinforcing strips $c$ and $c'$ of which the strips $c'$ are at the sides of the box and have rigidly engaged thereon segment plates F on which said rollers track when the axles are cramped as shown in Fig. 1. A king bolt G extends through each bolster centrally thereof and through the reinforcing strips $c$ and the bottom of the box C and is provided with a nut and a washer $g$ beneath the bolster and washers $g'$ between the bolster and strip $c$ the latter of which act to support the box centrally. Said segments act as a fifth wheel at each end of the box and any tendency of the box to side swing is controlled by the coiled springs H—H the inner ends of which are engaged in eye bolts $h$—$h$ secured in the axles adjacent the reach and the outer ends of which are engaged on hooks $h'$ as shown formed integrally with the plates $e^2$.

The operation is as follows: The pivotal engagement of the reach with the axles permits each axle to turn and when the front axle turns in one direction the cross rods $b^8$ act to turn the rear axle oppositely thereby throwing the hind end of the vehicle oppositely from the forward end and enabling the wagon to turn in a much smaller arc than when the front axle only is pivoted. Owing to the fact that the cross rods are connected directly to the axles by means of the eye bolts which are rigid in the axles there is little lost motion of the forward axle and when the vehicle is going straight ahead the tracking of the rear wheels with the forward wheels is insured. Should the joint between the rods $b^8$ and the connecting eye bolts become worn it is only necessary to reduce the size of the hooks by bending them inwardly thus making a tighter joint. Inasmuch as the bolsters are raised above the axles by the springs D it is evident that the vehicle wheels $a$ can turn beneath the box C and it is also evident that owing to the pivotal connection of the box with each bolster the axles are permitted to turn freely beneath the box while the rollers on the end of the bolsters act to support the box at all times and prevent its tipping.

Obviously any preferred form of spring other than that shown may be used and various details of construction may be varied without departing from the principles of my invention and I therefore do not desire being limited in this application other than necessitated by the prior art and as stated in the claims.

I claim as my invention:

1. In a vehicle the combination with the front and rear axles, a reach pivotally connected at each end centrally to the respective axles, rods pivotally connecting each end of one axle and the opposite ends of the other axle and securing said ends in unvarying relation, a spring engaged to each end of each axle, a bolster, a plate rigidly connecting the bolster to said spring, springs connected at their inner ends centrally to each axle and at their outer ends to the respective plates adapted to prevent lateral movement of the bolsters.

2. In a vehicle the combination with the front and rear axles, a reach pivoted at each end to the respective axles, rods pivotally engaged to each axle, said rods connecting opposite ends of the axles and rigidly holding said ends a fixed distance apart, a spring rigidly bolted to the ends of each axle, a bolster, a plate connecting said bolster at its ends to said springs, a body pivoted to each bolster centrally thereof, tracks engaged to the bottom of said body at each corner thereof and wheels engaged to the ends of each bolster adapted to move over said tracks.

3. In a vehicle the combination with the front and rear axles, a reach pivoted at each end to the axles, rods pivotally connecting opposite ends of said axles, a spring rigidly engaged to each end of the axles, a bolster, plates rigidly engaging the upper leaf of said springs and the ends of the bolster, springs engaged centrally to the axles and each engaged to one of said plates, a body pivoted at each end to the bolster centrally thereof, wheels engaged to the ends of the bolsters and a track at each corner of the body.

4. In a device of the class described the combination with the front and rear axles of a reach pivotally connected with each, rods engaging opposite ends of said axles, springs rigidly engaged on said axles, a bolster engaged on the springs of each axle, coiled springs engaged at their inner ends centrally of each axle and at their outer ends on hooks beneath said bolsters, a roller on each end of each bolster, a box pivoted on said bolsters centrally thereof, and segment plates engaged to each corner of said body affording bearings for said rollers.

5. In a vehicle the combination with the axles thereof, of means connecting the same acting to cramp them oppositely in turning, leaf springs on said axles, bolsters carried on the outer leaf of said springs, coiled springs engaged to said axles centrally thereof and the tops of said leaf springs, a shaft in each end of each bolster, a roller on each, a box pivoted to the center of said bolsters and a track at each corner of the wagon affording bearings for said rollers.

6. In a device of the class described the combination with the front and rear axles of independent rods acting to cramp said axles oppositely in turning, a spring adjacent each end of each axle, bolsters rigidly engaged thereon, tension members engaged to each end of said bolsters and to said axles, a roller journaled on each end of each bolster, a box pivotally connected at each end with said bolsters centrally thereof and segment plates engaged to each corner of the body affording bearings for said rollers.

In testimony whereof I have hereunto subscribed my name in the presence of two subscribing witnesses.

ELMER L. BRILLHART.

Witnesses:
 W. W. WITHENBURY,
 WM. C. SMITH.